United States Patent Office 3,458,880
Patented Aug. 5, 1969

3,458,880
POLYESTER AND POLYAMIDE FIBER DYEING WITH 7-AMINO-COUMARINS
Jacques Voltz and Heinrich Hausermann, Riehen, near Basel, Switzerland, assignors to J. R. Geigy A.G., Basel, Switzerland
No Drawing. Filed Oct. 7, 1965, Ser. No. 493,881
Claims priority, application Switzerland, Nov. 13, 1964, 14,663/64
Int. Cl. D06p 3/24, 3/52
U.S. Cl. 8—162         16 Claims This invention relates to novel colored synthetic materials made from polyester and synthetic polyamide fibers and to processes for the coloring of polyester and synthetic polyamide fiber materials to obtain the aforesaid novel colored materials.

In a first aspect, the invention comprises colored polyester fiber materials and colored synthetic polyamide fiber materials useful as textile materials, which constitute solid solutions of:

(a) One or several water-dispersible coumarin compounds the molecule of which is free from water solubilizing groups that would dissociate acid in water, and bears in 7-position at the coumarin nucleus an amino group and at the 3-position of the said nucleus a heterocyclic radical of the formula

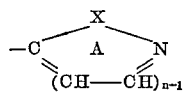

wherein:

$n$ represents one of the integers 1 and 2, and

X represents a divalent radical which complements the ring A to an electron-absorbing ring of aromatic character, and of from five to six ring members, and thereby shifts light absorption of the aforesaid coumarin compound sufficiently into the visible range of the electromagnetic spectrum to achieve a greenish to reddish yellow, fluorescent coloring effect.

(b) A fiber material from among the following:

Cellulose acetates such as cellulose di- and tri-acetate, or polyesters of aromatic polycarboxylic acids with polyvalent alcohols such as polyethylene glyco terephthalates, polyhexahydroxylyl diol terephthalates, polyethylene glycol isophthalates, furthermore synthetic polyamides which form textile fibers, especially nylon 6 and nylon 66, and also polyurethanes, which materials can be in the form of filaments, threads, yarns, fabrics or sheets.

The concentration of (a) ranging from about 0.0025% by weight calculated on the weight of the colored fiber material, up to saturation, e.g. about 5% in the case of polyethylene glycol terephthalate fiber, whereby the fiber materials according to the invention show a vivid greenish to reddish yellow, strongly fluorescent color which has previously never been achieved in polyester or polyamide materials by dyeing or printing.

The novel colored materials according to the invention are further characterized by great color strength, high grade fastness to sublimation, and, very unexpectedly, also excellent fastness to light, furthermore, by very good fastness to milling, solvents, cross dyeing and decatizing. In addition textile goods made therefrom show excellent wearing fastness properties, particularly very good fastness to light, washing, rubbing, perspiration and industrial fumes.

These fastness properties, and especially the superior light fastness, in spite of the pronounced fluorescent effect, of the novel colored fiber materials is particularly surprising, since other yellow coloring agents which are known to afford in cationic form colored polyacrylonitrile materials of satisfactory light fastness, failed on polyester or synthetic polyamide fibers since they yielded only products of weak color strength, which, moreover, showed insufficient fastness to washing, sublimation and light.

Among the novel colored fiber materials according to the invention those are particularly distinguished by the aforesaid advantageous properties which are solid solutions in the aforesaid fiber materials of a compound free from water-solubilizing groups which dissociate acid in water of the formula

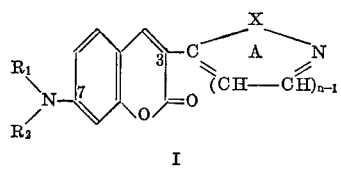

I wherein:

$n$ represents the number 1 or 2, and $R_1$ and $R_2$ each represents hydrogen, an optionally substituted alkyl group or a cycloalkyl group, preferably alkyl of 1 to 6 carbon atoms, chloro-lower alkyl, bromo-lower alkyl, cyano-lower alkyl, hydroxy-lower alkyl, lower alkoxy-lower alkyl, lower alkanoyloxy-lower alkyl, lower alkoxy-carbonyl-lower alkyl, phenyl-lower alkyl or cyclohexyl, or $R_1$ and $R_2$ together with the nitrogen atom to which they are linked, with the optional inclusion of another hetero atom, can form a hetero ring, especially pyrrolidino, piperidino or morpholino radicals, X represents a divalent radical which completes the nitrogen-containing ring A to a five- or six-membered ring of aromatic character and shifts light absorption of the coumarin moiety of the compounds of Formula I sufficiently into the visible range of the spectrum to achieve a yellow fluorescent coloring effect; more particularly an azole or an azine ring which may be fused with carbocyclic aromatic rings, e.g. with the naphthalene ring or, preferably, with the benzene ring, which fused rings may be substituted by substituent Y, and (a) in the case of ring A being an azole ring, and $n$ representing the integer 1, X is, for example, the vinyl-amino radical —CH=CH—NH—, the vinylthio radical —CH=CH—S—, the vinyloxy radical —CH=CH—O— or the radicals —CH=N—NH—, —N=CH—O—, —N=CH—S—, so that, in these meanings, X forms with the other members of ring A a pyrazole, imidazole, thiazole, oxazole, 1,2,4-triazole, 1,3,4-oxadiazole or 1,3,4-thiadiazole ring; or X represents a divalent o-phenylimino radical

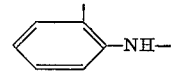

an o-phenylthio radical

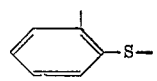

or an o-phenoxy radical

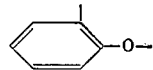

so that consequently, the hetero ring A is a benzimidazole, benzothiazole or benzoxazole ring;

(b) in the case of ring A being an azine ring, and $n$ representing the integer 1, the radical X which completes the ring A, represents, more especially, the butadienylene radical —CH=CH—CH=CH—, the styrylene radical

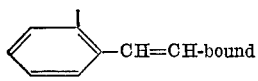

in o-position to the vinylene group, or the divalent propenylimino radical —CH=CH—CH=N—, while $n$ represents 2, X represents preferably the vinylene or o-phenylene radical, so that, in these meanings, X forms together with the other members of ring A, in the first instance ($n=1$), a pyridine, quinoline or pyrimidine ring bound in the 2-position to the coumarin radical, and, in the second instance ($n=2$), a pyridine or quinoline ring bound in the 4-position to the coumarin radical.

The aromatic rings fused to the hetero ring A in the above named subclasses, especially the benzene rings of the benzimidazole, benzothiazole, benzoxazole or quinoline radicals mentioned, can be further substituted but should contain no water solubilizing groups which dissociate acid in water. Examples of substituent Y in these fused rings are (a) halogens such as chlorine or bromine, (b) unsubstituted lower alkyl, (c) alkyl substituted by hydroxyl, lower alkoxy, fluorine, chlorine or bromine, (d) lower alkoxy groups such as methoxy or ethoxy groups; (e) carbacyl groups, particularly lower alkanoyl groups such as the acetyl group; (f) lower alkyl sulfonyl groups such as the methylsulfonyl or ethylsulfonyl group; (g) sulfonic acid aryl ester groups such as the sulfonic acid phenyl ester group; (h) carboxylic acid ester groups, particularly lower alkoxycarbonyl groups such as methoxycarbonyl or ethoxycarbonyl, or phenoxycarbonyl; (i) unsubstituted carbamyl or sulfamyl; (j) N-mono-substituted or N,N-disubstituted carbamyl or sulfamyl, particularly N-alkyl or N,N-dialkyl-carbamyl or -sulfamyl; (k) acylamino groups, in particular lower alkanoylamino radicals such as the acetylamino radical; (l) alkylsulfonylamino radicals such as the methylsulfonylamino radical; but for reasons of preparation, among the alkyl groups defined under (b) and (c), (b), i.e. unsubstituted lower alkyl, is preferred.

Preferably X is a divalent radical which completes the nitrogen-containing ring A in an azole ring fused with carbocyclic aromatic rings, particularly a benzazole ring.

In compounds which are particularly easily accessible X is a divalent o-phenylimino radical and $n$ is 1; i.e. X, with the other members of ring A, forms a benzimidazole ring. This ring is bound in the 2-position to the coumarin ring and can be unsubstituted or can be further substituted in the manner described above.

If, in the compounds of Formula I $R_1$ and $R_2$ each represent an alkyl radical then this preferably has from 1 to 4 carbon atoms. If this alkyl radical is substituted, then it is by substituents which do not dissociate acid in water, for example halogens such as chlorine or bromine, the cyano group, the hydroxyl group, ether groups, particularly lower alkoxy groups, acyloxy groups, preferably lower alkanoyloxy groups, carboxylic acid ester groups such as lower alkoxycarbonyl groups, or aryl groups, particularly the phenyl group; in this case, $R_1$ and $R_2$ are, for example, the β-chloro- or β-bromoethyl, β-cyanoethyl, β-hydroxyethyl, β- or γ-hydroxyethyl, β- or γ-hydroxypropyl, β,γ-dihydroxypropyl, β-methoxy- or β-ethoxyethyl, γ-methoxy- or γ-ethoxypropyl, β-acetoxy- or β-propionyloxyethyl, carbomethoxymethyl, carbethoxymethyl or benzyl group.

In the most preferred compounds falling under Formula I, $R_1$ and $R_2$ are identical and are a lower alkyl group, particularly the methyl or ethyl group.

"Lower" as used in connection with an aliphatic radical in this specification and the appended claims means that such radical has from 1 to 4 carbon atoms.

The colored fiber materials according to the invention are produced preferably by immersing the uncolored fiber materials in an aqueous dispersion containing an adequate amount of coumarin compound falling under Formula I, and keeping them therein or passing them therethrough, so that the material remains a sufficient length of time in contact with the dispersion to achieve the desired depth of color in the material, while the dispersion bath is maintained at a suitable temperature depending on the nature of the fiber material, and the fiber material is then further processed, as described in more detail below.

In order to prepare suitable baths, the coumarin compounds are brought into a finely distributed form by milling with dispersing agents.

Suitable dispersing agents are, for example, anionic dispersing agents such as alkylaryl sulfonates, condensation products of formaldehyde with naphthalene sulfonic acids, lignin sulfonates, or non-ionogenic dispersing agents such as fatty alcohol polyglycol ethers. Advantageously mixtures of these dispersing agents are used.

Polyesters of aromatic polycarboxylic acids with polyvalent alcohols are preferably colored in a dispersion bath at temperatures of over 100° C. and under corresponding pressure. Coloring can also be performed, however, at the boiling point of the chlorobenzene or similar auxiliaries, or by padding followed by thermofixation at 180–210° C. Cellulose diacetate fibers are preferably colored at temperatures of 80 to 85° C. whilst cellulose triacetate fibers and also synthetic polyamide fibers are colored at the boiling point of the bath. When coloring the latter type of fibers, the use of carriers is not necessary.

The materials mentioned can also be colored by printing an aqueous printing paste containing compound of Formula I onto the uncolored fiber material and then steaming or thermofixing the printed material in the presence of a carrier as defined above between about 90 and 110° C. or, in the absence of a carrier, between about 120 and 140° C.

Certain fiber-forming cellulose esters such as cellulose diacetate and, principally, triacetate, can also be colored in the spinning mass as the coumarin compounds usable according to the invention dissolve well in many organic solvents, e.g. in acetone.

Good and evenly penetrated colored products according to the invention are obtained even from very closely woven fabrics or strongly twisted yarns of the said fibers.

In the coloring processess according to the invention, when using blends of polyester or synthetic polyamide materials with wool or with cellulosic fibers such as cotton, the latter are very well reserved.

The coumarin compounds of Formula I can also be used in admixture with disperse dyestuffs used in the dyeing of fibers which are to be subjected to dry fixing.

The coumarin compounds which are useful as coloring agents in the product of the new colored fiber materials according to the invention are produced by condensing an aromatic o-hydroxy or o-alkoxy aldehyde with a heterocyclic active methylene compound of the formula

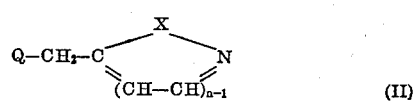

(II)

and then closing the ring. In this formual X and $n$ have the same meaning as in the preceding formulas and Q represents a carboxylic group or, preferably, a transformed carboxylic group, i.e. a carbalkoxy, a carbamyl or a cyano group. The condensation is performed in an alkaline medium, but ring closure is preferably effected in an acid medium or melt, the acidity and temperature being so chosen as to effect slitting of the ether linkage of the condensation product of an α-alkoxy aldehyde is used. If Q is the cyano group, then rearrangement to the corresponding 2-iminocourmarin first occurs, which compound is hydrolized in hot acid aqueous solution to the desired 3-heterocyclically substituted coumarin.

A further method for the production of the preferred 3-aryloazolyl-(2')-coumarins of Formula I consists in reacting a coumarin compound of the formula

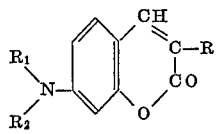
(III)

wherein:

$R_1$ and $R_2$ have the same meanings as in Formula I, and R represents a carboxylic acid, a carboxylic acid halide, a carboxylic acid ester or a carbamyl group, with an aromatic amine which contains a thio group or a primary or secondary amino group in a position vincinal to the primary amino group.

Details about the production of the said coumarin compounds by the above two methods are given in Patent No. 3,014,041 to Häusermann et al., issued Dec. 19, 1961.

Compounds falling under Formula II in which Q represents the cyano group are, in turn, produced by the method described by Winterfeld et al. in "Archiv der Pharmacie" 289 (vol. 61) page 448 et seq.

The following non-limitative examples serve to illustrate the invention further. In these examples, where not otherwise stated, parts and percentages are given by weight and their relationship to parts by volume is as that of gram to milliliters. The temperatures are in degrees centigrade.

Example 1

1 g. of the coumarin compound of the formula

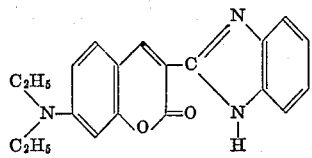

is finely milled with a mixture of 1 g. of lignin sulphonate and 1 g. of the sodium salt of a condensation product of naphthalene-2-sulphonic acid and formaldehyde.

1 g. of the coloring preparation thus obtained is dispersed in 4000 g. of water. To this dispersion 20 g. of sodium salt of o-phenylphenol and 20 g. of diammonium sulphate are added as carried and 100 g. of Dacron 54 (polyglycol terephthalate) yarn is introduced into the bath and left therein for 90 minutes at 95–98°. The bath is substantially exhausted. The fabric is rinsed with water and then after-treated for 15 minutes at 80° in 4000 ml. of water with 12 g. of 30%-sodium hydroxide solution and 4 g. of octaylphenyl polyglycol ether with about 15 ethyleneoxy groups. The dyed material is then again thoroughly rinsed with water and dried. In this way, greenish yellow products are obtained which are of very high brilliancy and have excellent fastness to washing and sublimation and very good fastness to light. If, in this example, the 20 g. of sodium salt of o-phenylphenol are replaced by 20 g. of a usual commercial carrier preparation, e.g. an emulsion of 20 g. of o-phenylphenol in water or 20 g. of p-chlorophenoxyethanol, 20 g. of dichlorobenzene, 20 g. of cresotinic acid methyl ester or 20 g. of a mixture of 1 part of terephthalic acid methyl ester and 1 part of benzanilide, and otherwise the procedure described in the example is followed, then brilliant by yellow, fluorescent product having the same fastness properties are also obtained.

The coumarin compound used in this example is produced as described in Example 1 of U.S. Patent 3,014,041.

26.1 parts of 7-N-dimethylaminocoumarin-3-carboxylic acid ethyl ester, 14.5 parts of 4-chloro-1,2-diaminobenzene and 0.2 part of boric acid in a mixture of 50 parts of diphenyl and 50 parts of diphenyl ether are heated for 3 hours at 250–260°. A dark yellow melt is formed while alcohol and steam are given off. On cooling the melt solidifies in crystalline form. The reaction mixture is boiled out in about 300 parts by volume of toluene and, after cooling, the yellow precipitate is filtered off and washed with benzene and alcohol. The 3-(benzimidazol-2')-7-di-methylaminocoumarin formed crystallises from chlorobenzene in yellow, longish leaflets. They melt at 329–330°.

Example 2

In a pressure dyeing apparatus, 0.5 g. of the dyestuff of the formula

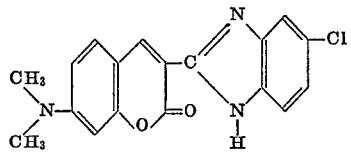

are finely suspended in 2000 ml. of water containing 4 g. of oleyl polyglycol ether. The pH of the dyebath is adjusted to 6 to 6.5 by the addition of acetic acid.

100 g. of Dacron 54, (polyglycol terephthalate) staple fiber fabric are entered at 50°, the bath is heated under pressure to 130° within 30 minutes and the fabric is dyed for 50 minutes at this temperature. The dyeing is then washed with water, soaped, again rinsed with water and dried. In this way a greenish yellow dyeing of the highest brilliancy is obtained. It is fast washing, perspiration, light and sublimation.

The coumarin compound of the above formula is produced as described in Example 8 of U.S. Patent 3,014,-041, but using 4-chloro-1,2-diaminobenzene in lieu of 4-methyl-1,2-diaminobenzene used therein and the respective aminocoumarin-3-carboxylic acid ethyl ester falling under formula III of the instant specification.

The dyestuffs listed in the following Table I are produced in the same manner as described above from the compound starting material of Formula III and the correspondingly 4-substituted 1,2-diaminobenzene, resulting in compounds falling under the formula

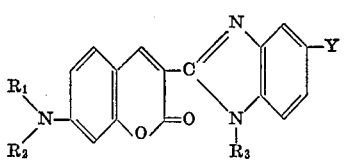

and afford greenish yellow colored products having similar properties which are solid solutions of the listed compound in polyglycol terephthalate fibers, obtained under the same conditions, as outlined in Example 2.

In the table, $R_1$ and $R_2$ have the meanings given in Formula I, $R_3$ represents hydrogen or lower alkyl, and Y represents a substituent as defined above.

TABLE I

| Example No. | $R_1$ | $R_2$ | $R_3$ (=lower alkyl or H) | Y |
|---|---|---|---|---|
| 3 | $-C_4H_9$ | $-C_4H_9$ | H | $-CH_3$ |
| 4 | $-C_2H_5$ | $-C_2H_5$ | H | $-SO_2-CH_3$ |
| 5 | $-CH_3$ | $-CH_3$ | $-CH_3$ | $-SO_2-N(CH_3)_2$ |
| 6 | $-C_2H_5$ | $-C_2H_5$ | $-CH_3$ | $-SO_2-N(CH_3)_2$ |
| 7 | $-C_2H_5$ | $-C_2H_5$ | $-CH_3$ | $-SO_2-NH-CH_3$ |
| 8 | $-C_2H_5$ | $-C_2H_5$ | $-CH_3$ | $-SO_2-NH_2$ |
| 9 | $-C_2H_5$ | $-C_2H_5$ | H | H |
| 10 | $-CH_2-\langle\rangle$ | $-CH_3$ | H | H |
| 11 | $-C_6H_{11}$ | H | H | H |
| 12 | $-C_2H_5$ | $-C_2H_5$ | H | Br |
| 13 | $-CH_2CH_2-CN$ | $-CH_3$ | H | H |
| 14 | $-CH_2CH_2-OC$ | $-CH_3$ | H | H |
| 15 | $-CH_2CH_2-OH$ | $-C_2H_5$ | H | $-CH_3$ |
| 16 | $-C_3H_7$ | H | H | H |
| 17 | H | H | $-CH_3$ | H |
| 18 | $-CH_2CH_2-Cl$ | $-CH_3$ | H | H |
| 19 | $CH_3$ | $-CH_3$ | H | $-CO-O-\langle\rangle$ |
| 20 | $CH_3$ | $-CH_3$ | H | $-CH_2-CH_2-OH$ |
| 21 | $C_2H_5$ | $-C_2H_5$ | H | $-CH_2-CH_2-OCH_3$ |
| 22 | $CH_3$ | $CH_3$ | H | $-CH_2-CH_2-Cl$ |
| 23 | $CH_3$ | $CH_3$ | H | $-CH_2Br$ |
| 24 | $C_3H_7$ | $C_3H_7$ | H | $-CF_3$ |
| 25 | $CH_3$ | $CH_3$ | H | $-CO-CH_3$ |
| 26 | $CH_3$ | $CH_3$ | H | $-SO_2-O-\langle\rangle$ |
| 27 | $C_2H_5$ | $C_2H_5$ | H | $-CO-OCH_3$ |
| 28 | $CH_3$ | $CH_3$ | H | $-CONH_2$ |
| 29 | $CH_3$ | $CH_3$ | H | $-SO_2NHCH_3$ |
| 30 | $CH_3$ | $CH_3$ | H | $-CH_3-CO-NH-$ |
| 31 | $CH_3$ | $CH_3$ | H | $CH_3-SO_2-NH-$ |
| 32 | $CH_3$ | $CH_3$ | H | $CO-N(CH_3)_2$ |

Example 33

If, instead of the coumarin derivative described in Example 1, the compound of the formula

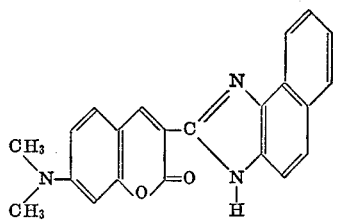

is used and otherwise the procedure given in Example 1 is followed, then a greenish yellow dyeing having similar properties is also obtained.

The compound of the above formula is produced as described in Example 11 of U.S. Patent 3,014,041.

Example 34

Dacron 54 (polyglycol terephthalate) staple fiber fabric is impregnated on a pad mangle at 40° with a liquor of the following composition:

10 g. of the coumarin compound used in Example 1, finely dispersed in
7.5 g. of sodium alginate,
20 g. of triethanolamine,
20 g. of octylphenyl polyglycol ether and
900 g. of water.

The fabric is squeezed out to a liquor content of about 100% and dried at 100°. The colored fabric is then fixed for 30 seconds at a temperature of 200–210°. The goods are rinsed with water, soaped and dried. In this way, a very brilliant greenish yellow fabric is obtained which is fast to washing, rubbing, light and sublimation.

Example 35

2 g. of the compound of the formula

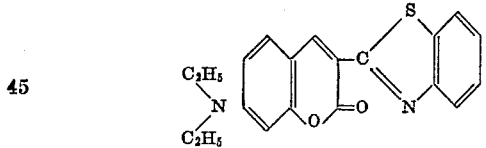

are dispersed in 4000 ml. of water.

100 g. of nylon 6 fabric are introduced at 70° and the temperature of the bath is raised to 100° within 30 minutes. The fabric is then left for 1 hour at the boil. The goods are rinsed with water, soaped, again thoroughly rinsed with water and dried.

In this way an extremely brilliant greenish yellow fabric is obtained.

The coumarin compound used in the above example is produced as follows:

2.9 parts of 7-N-diethylaminocoumarin-3-carboxylic acid ethyl ether (produced by condensation of malonic acid diethyl ester and 4-diethylamino-2-hydroxybenzaldehyde to close the ring) and 1.25 parts of o-aminothiophenol are dissolved in 10 parts of a mixture of diphenyl and diphenyl ether and the solution is boiled for 1 hour. The reaction mass is cooled and 20 parts of ethyl alcohol are added whereupon the temperature is again raised and the ethyl alcohol is again distilled off. The reaction solution is finally refluxed for a further hour. The crude 3-(benzthiazolyl-2')-7-diethylaminocoumarin is precipitated by the addition of the same volume of ethyl alcohol and cooling in ice. On crystallizing from 75% aqueous pyridine it is obtained in the form of orange needles which melt at 204°.

Similar greenish yellow fabrics are obtained on polyamide and polyurethane fibers on using the coumarin compounds given in the following Table II with otherwise the same procedure. These coumarin compounds are produced in the same manner as the coumarin compound of Example 35.

TABLE II

![Structure with X on benzo-coumarin and Y on benzothiazole]

| Example No. | X | Y |
|---|---|---|
| 36 | $(CH_3)_2N-$ | $-CH_3$ |
| 37 | $(C_2H_5)_2N-$ | $-OCH_3$ |
| 38 | $(CH_3)_2N-$ | $Cl$ |
| 39 | $CN-CH_2-CH_2-NH-$ | $H$ |
| 40 | $(CH_3)_2N-$ | $-NH-COCH_3$ |
| 41 | $(C_2H_5)_2N-$ | $Br$ |
| 42 | $HO-CH_2-CH_2-N(CH_3)-$ | $H$ |
| 43 | morpholino- | $H$ |
| 44 | benzyl-N(CH_3)- | $H$ |
| 45 | piperidino- | $H$ |
| 46 | cyclohexyl-NH- | $H$ |
| 47 | benzyl-NH- | $H$ |
| 48 | $(C_4H_9)_2N-$ | $H$ |
| 49 | $Br-CH_2CH_2-NH-$ | $H$ |
| 50 | $CH_3O-CH_2-CH_2-NH-$ | $H$ |

Example 50a 1 g. of the coumarin compound used in Example 2 and 8 g. of oleic acid-N-methyl tauride are finely dispersed in 4000 ml. of water. 100 g. of cellulose diacetate fabric are introduced into the bath at 40° and the bath temperature is raised to 80° within 30 minutes. The fabric is then left for another 90 minutes in the bath at this temperature.

The colored material is well rinsed with warm and cold water and dried. A brilliant greenish yelow fabric is obtained in this way which has good wet fastness.

Example 50b 1 g. of the coumarin compound used in Example 1 and 8 g. of oleic acid-N-methyl taurides are finely dispersed in 400 ml. of water. 100 g. of cellulose triacetate fabric are in introduced at 60° and the bath temperature is raised to 100° within 30 minutes. The fabric is then left in the bath at the boil for 90 minutes. The fabric is rinsed and treated with a solution of 4 g. of a palmitic/stearic acid sulfonate in 4000 ml. of water for 15 minutes at 60–70°. The colored goods are then again well rinsed with water and dried.

The yellow fabric obtained is distinguished by brilliancy and good fastness to wet, light and sublimation.

Similar yellow fabrics of reddish hue are obtained on using 3-(4'-pyridyl)-7-diethylamino-coumarin, 3-(2'- pyridyl)-7-diethylamino-courmarin or 3-(2'-quinolyl)-7- diethylamino-courmarin.

These compounds can be produced as follows: 11.8 g. of 2-cyanomethyl pyridine (described in Winterfeld and Flick, Archiv de Pharmazie 289/61 vol., 1956 No. 8, p. 450) and 19.3 g. of 4-diethylamino-2-hydroxybenzaldehyde in 100 ml. of ethanol are reacted with 2 g. of pyridine and the reaction mixture is stirred for 24 hours at 25–35°. The yellow reaction mixture is then dissolved in 1000 ml. of 2% hydrochloric acid and refluxed for 10 hours while stirring. The 3-(2'-pyridyl)-7-diethylamino-coumarin formed is precipitated from the reaction solution with excess sodium acetate in the form of a brown-yellow precipitate. The product dissolved in organic solvents with a vivid fluorescence.

By repeating the production of a coumarin compound as described in the preceeding Example 50b, but replacing in the said example 2-cyanomethyl pyridine and 4-diethylamino - 2 - hydroxybenzaldehyde, respectively, by equivalent amounts of the following reactants listed in columns II and III, respectively, the corresponding coumarin compounds are obtained and used in the coloring of cellulose triacetate fabric as described in the first part of Example 50b.

TABLE III

| I Ex. No. | II Reactant "replacing" 2-cyanometh 1-pyridine | III Reactant "replacing" 4-dimethylamino-2-hydroxybenzaldehyde |
|---|---|---|
| 51 | 3-cyanomethyl-pyrazole | |
| 52 | 4-cyanomethyl pyridine | 4-[(2'-acetoxy-ethyl)-amino]-2-hydroxybenzaldehyde. |
| 53 | 2-cyanomethyl quinoline | 4-[(2'-acetyl-ethyl)-amino]-2-hydroxybenzaldehyde. |
| 54 | 4-cyanomethyl quinoline | |
| 55 | 2-cyanomethyl-imidazole | 4-cyclohexylamino-2-hydroxybenzaldehyde. |
| 56 | 3-cyanomethyl-oxazole | 4-pyrrolidine-2-hydroxybenzaldehyde. |
| 57 | 5-cyanomethyl-1,2,4-triazole | 4-dimethylamino-2-hydroxybenzaldehyde. |
| 58 | 5-cyanomethyl-1,2,4-oxadiazole | 4-amino-2-hydroxybenzaldehyde. |
| 59 | 5-cyanomethyl-1,3,4-thiadiazole | |
| 60 | 2-cyanomethyl-pyrimidine | |
| 61 | 2-cyanomethyl-benzothiazole | |
| 62 | 2-cyanomethyl-5-trifluoromethyl-benzoxazole | |
| 63 | 3-cyanomethyl-indazole | |

Example 64

Dacron 54 (polyglycol terephthalate staple fiber) fabric is printed on a printing machine at 25° with a liquor of the following composition:

30 g. of the coumarin compound used in Example 1, finely dispersed in
300 g. of water
40 g. of urea
400 g. of crystal gum as thickener and
200 g. of a aqueous 10% o-phenylphenol emulsion.

The printed fabric is steamed for 1 hour at 100°, then soaped, rinsed with water and dried.

In this way a brilliant, greenlish yellow printed fabric is obtained which is distinguished by good fastness to washing, rubbing light and sublimation.

Example 65

1 g. of the compound of the formula

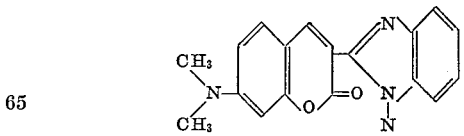

is finely dispersed in 4000 ml. of water containing 8 g. of oleic acid-N-methyl tauride. 100 g. of nylon 66 fabric are introduced into the bath at 70° and the temperature of the bath is raised to 100° within 30 minutes. The fabric is then left in the bath at the boil for 1 hour. The goods are then rinsed with water, soaped, again rinsed with water and dried. The resulting yellow colored fabric, which has an intensive greenish fluorescence, is distinguished by its good wet and light fastness.

Example 66

1 g. of the coloring preparation described in Example 1 is dispersed in 4000 ml. of water.

100 g. of Lycra (polyurethane) fibers are introduced at 70° and the temperature of the bath is raised to 100° within 30 minutes. The fibers are then left for 1 hour at the boil. The goods are rinsed with water, soaped, again rinsed thoroughly with water and dried. A brilliant greenish yellow fiber material, is obtained in this way having excellent wet fastness.

We claim:

1. A process for the coloring of polyester fibers comprising treating said fibers with an aqueous dispersion containing dispersed therein a dispersible coumarin compound free from water-solubilizing groups which dissociate acid in water, which compound is of the formula

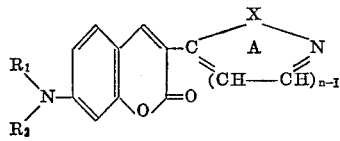

wherein:

X represents a divalent radical which makes up the nitrogen-containing ring A into a five- or six-membered ring of aromatic character, and shifts light absorption of the N-substituted 7-amino-coumarin moiety sufficiently into the visible range to achieve a yellow fluorescent coloring effect, $n$ represents the number 1 or 2, and each of $R_1$ and $R_2$ represents hydrogen, alkyl of from 1 to 6 carbon atoms, chloro-lower alkyl, bromo-lower alkyl, cyano-lower alkyl, hydroxy-lower alkyl, lower alkoxy-lower alkyl, lower alkanoyloxy-lower alkyl, lower alkoxy-carbonyl, phenyl-lower alkyl, and $R_1$ and $R_2$ together with the nitrogen atom to which they are linked, form pyrrolidino, piperidino or morpholino, the process being carried out at superatmospheric pressure and at a temperature of from 100 to 130° C., said coumarin compound being present in an amount sufficient to provide a greenish-yellow fiber having good color strength.

2. A process as defined in claim 1 wherein said fibers consist of polyethylene glycol terephthalate.

3. A process as defined in claim 1 wherein said fibers consist of cellulose triacetate.

4. A process as defined in claim 1 wherein said fibers consist of cellulose diacetate.

5. A brilliant yellow, fluorescent solid solution of a dispersible coumarin compound the molecule of which is free from water-solubilizing substituent groups which dissociate acid in water, which compound bears in 7-position at the coumarin nucleus an amino group, and at the 3-position of the said nucleus a heterocyclic radical of the formula

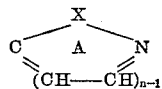

wherein:

X represents a divalent radical which complements the ring A to a five- to six-membered ring of aromatic character, and thereby shifts light absorption of the aforesaid coumarin compound sufficiently into the visible range of the electromagnetic spectrum to achieve a fluorescent greenish-yellow coloring effect, and $n$ is one of the integers 1 or 2, in a member selected from the group consisting of polyester fibers and synthetic polyamide fibers, said compound being present in said material in a concentration of at least 0.0025% by weight calculated on the total weight of the solution.

6. A solid solution as defined in claim 5, wherein said coumarin compound is 3-(benzimidazole-2')-7-di-ethyl-amino-coumarin.

7. A solid solution as defined in claim 5, wherein said coumarin compound is 3-(benzimidazole-2')-7-di-ethyl-amino-coumarin and said member is polyglycol terephthalate fiber material.

8. A solid solution as defined in claim 5 wherein said coumarin compound is 3-(5'-chloro-benzimidazole-2')-7-dimethylamino-coumarin.

9. A solid solution as defined in claim 5 wherein said coumarin compound is 3-(5'-chloro-benzimidazole-2')-7-dimethylamino-coumarin and said member is polyglycol terephthalate fiber material.

10. A process as in claim 1 wherein the dispersing agent is a member selected from the group consisting of anionic dispersing agents, non-ionogenic dispersing agents, and mixtures thereof.

11. A method as in claim 1 wherein the dye carrier is a member selected from the group consisting of o-phenylphenol and dichlorobenzene.

12. A process as in claim 1 wherein the polyester fiber is that of a polyester of an aromatic polycarboxylic acid with polyvalent alcohols.

13. A process for the coloring of polyester fibers comprising dyeing said fibers with an aqueous dispersion of a dispersible coumarin compound free from water-solubilizing groups which dissociate acid in water, which compound is of the formula

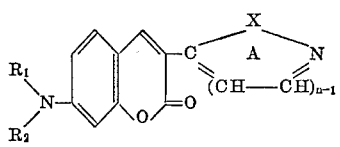

wherein:

X represents a divalent radical which makes up the nitrogen-containing ring A into a five- or six-membered ring of aromatic character, and shifts light absorption of the N-substituted 7-amino-coumarin moiety sufficiently into the visible range to achieve a yellow fluorescent coloring effect, $n$ represents the number 1 or 2, and each of $R_1$ and $R_2$ represents hydrogen, alkyl of from 1 to 6 carbon atoms, chloro-lower alkyl, bromo-lower alkyl, cyano-lower alkyl, hydroxy-lower alkyl, lower alkoxy-lower alkyl, lower alkanoyloxy-lower alkyl, lower alkoxy-carbonyl, phenyl-lower alkyl, and $R_1$ and $R_2$ together with the nitrogen atom to which they are linked, form pyrrolidino, piperidino or morpholino, said coumarin compound being present in an amount sufficient to provide a greenish-yellow fiber having good color strength.

14. A process for the coloring of polyester fibers comprising printing said fibers with a printing paste containing dispersed therein a dispersible coumarin compound free from water-solubilizing groups which dissociate acid in water, which compound is of the formula

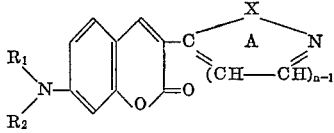

wherein:

X represents a divalent radical which makes up the nitrogen-containing ring A into a five- or six-membered ring of aromatic character, and shifts light absorption of the N-substituted 7-amino-coumarin moiety sufficiently into the visible range to achieve a yellow fluorescent coloring effect, $n$ represents the number 1 or 2, and each of $R_1$ and $R_2$ represents hydrogen, alkyl of from 1 to 6 carbon atoms, chloro-lower alkyl, bromo-lower alkyl, cyano-lower alkyl, hydroxy-lower alkyl, lower alkoxy-lower alkyl, lower alkanoyloxy-lower alkyl, lower alkoxy-carbonyl, phenyl-lower alkyl, and $R_1$ and $R_2$ together with the nitrogen atom to which they are linked, form pyrrolidino, piperidino or morpholino, said coumarin compound being present in an amount sufficient to provide a greenish-yellow fiber having good color strength.

15. A process for the coloring of synthetic polyamide fiber comprising treating said fiber material with an aqueous dispersion containing dispersed therein a dispersible coumarin compound the molecule of which is free from water-solubilizing substituent groups which dissociate acid in water, which compound bears in 7-position at the coumarin nucleus an amino group, and at the 3-position of the said nucleus a heterocyclic radical of the formula

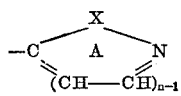

wherein:

X represents a divalent radical which complements the ring A to a five- to six-membered ring of aromatic character, and thereby shifts light absorption of the aforesaid coumarin compound sufficiently into the visible range of the electromagnetic spectrum to achieve fluorescent greenish-yellow coloring effect, and $n$ is one of the integers 1 and 2, said aqueous dispersion also containing an effective amount of a dispersing agent, said coumarin compound being present in an amount sufficient to provide a greenish-yellow fiber having good color strength.

16. A process for the coloring of polyester fibers which comprises padding said fiber material with a padding liquor containing dispersed therein a dispersible coumarin compound free from water-solubilizing groups which dissociate acid in water, which compound is of the formula

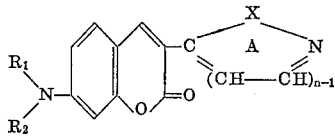

wherein:

X represents a divalent radical which makes up the nitrogen-containing ring A into a five- or six-membered ring of aromatic character, and shifts light absorption of the N-substituted 7-amino-coumarin moiety sufficiently into the visible range to achieve a yellow fluorescent coloring effect, $n$ represents the number 1 or 2, and each of $R_1$ and $R_2$ represents hydrogen, alkyl of from 1 to 6 carbon atoms, chloro-lower alkyl, bromo-lower alkyl, cyano-lower alkyl, hydroxy-lower alkyl, lower alkoxy-lower alkyl, lower alkanoyloxy-lower alkyl, lower alkoxy-carbonyl, phenyl-lower alkyl, and $R_1$ and $R_2$ together with the nitrogen atom to which they are linked, form pyrrolidino, piperidino or morpholino, and thermo-fixing the colored fabric at a temperature of from 180 to 210° C., said coumarin compound being present in an amount sufficient to provide a greenish-yellow fiber having good color strength.

References Cited

UNITED STATES PATENTS 3,014,041  12/1961  Hauserman _____ 260—304

FOREIGN PATENTS 621,482  12/1962  Belgium.
372,307  10/1963  Switzerland.

DONALD LEVY, Primary Examiner

U.S. Cl. X.R.

8—76, 179